US012663922B2

(12) United States Patent
Barsness et al.

(10) Patent No.: US 12,663,922 B2
(45) Date of Patent: Jun. 23, 2026

(54) DEFERRED ADAPTIVE COMPRESSION USING COMPUTATIONAL STORAGE FOR ENERGY SAVINGS

(71) Applicant: INTERNATIONAL BUSINESS MACHINES CORPORATION, Armonk, NY (US)

(72) Inventors: Eric Lawrence Barsness, Pine Island, MN (US); Nicholas Battani, Rochester, MN (US); Joshua Paul Guyer, West St Paul, MN (US); Connor Mulcahy, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/734,470

(22) Filed: Jun. 5, 2024

(65) Prior Publication Data

US 2025/0377785 A1 Dec. 11, 2025

(51) Int. Cl.
*G06F 3/06* (2006.01)

(52) U.S. Cl.
CPC .......... *G06F 3/0608* (2013.01); *G06F 3/0625* (2013.01); *G06F 3/0638* (2013.01); *G06F 3/0653* (2013.01); *G06F 3/0673* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20;

(Continued)

(56) References Cited

U.S. PATENT DOCUMENTS 10,678,436 B1 * 6/2020 Jiang ..................... G06F 3/0661
11,687,338 B2 6/2023 Jones (Continued)

OTHER PUBLICATIONS

ONTAP 9 Documentation; NetApp; Mar. 8, 2024; retrieved from https://web.archive.org/web/20240309094808/https://docs.netapp.com/us-en/ontap/pdfs/fullsite-sidebar/ONTAP_9_Documentation.pdf (Year: 2024).*

(Continued)

*Primary Examiner* — Daniel C. Chappell
(74) *Attorney, Agent, or Firm* — KONRAD, RAYNES, DAVDA & VICTOR LLP; Rabindranath Dutta

(57) ABSTRACT

Provided are a method, system, and computer program product for performing deferred adaptive compression via a computational storage. On a drive that is initially empty, all data is written as uncompressed. In response to a first threshold level of storage space utilization being reached on the drive, compression of existing data on the drive is initiated. In response to a second threshold level of storage space utilization being reached on the drive, operations are performed for compressing incoming data and then writing the compressed incoming data to the drive, wherein the second threshold level is higher than the first threshold level.

18 Claims, 7 Drawing Sheets

(58) Field of Classification Search

CPC ........ G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

2008/0263244 A1* 10/2008 Mizuno ................. G06F 3/0638
                                                     710/68
2013/0339486 A1* 12/2013 Kulkarni ................. H04L 67/10
                                                     709/219

2016/0345260 A1 11/2016 Johnson et al.
2022/0342601 A1* 10/2022 Daoud ................... G06F 3/0634
2022/0350604 A1* 11/2022 Jones .................... G06F 13/362

OTHER PUBLICATIONS

A. Jain, E. Anceaume and S. Gujar, "Extending The Boundaries and Exploring The Limits Of Blockchain Compression," 2023 42nd International Symposium on Reliable Distributed Systems (SRDS), Marrakesh, Morocco, 2023, pp. 187-197, doi: 10.1109/SRDS60354. 2023.00027. (Year: 2023).*

"Adaptive Compression Rate," IP.com, IP.com No. IPCOM000205235D, Mar. 21, 2011, 3 pp.

"Energy Aware Application Behavior,", IP.com, IP.com No. IPCOM000180244D, Mar. 5, 2009, 2 pp.

"Framework for Reducing the Cost for Storage Clouds," IP.com, IP.com No. IPCOM000255337D, Sep. 18, 6 pp.

"Transparent Compression Using Noload Computational Storage Technology," Eideticom, 2020, 12 pp.

Mohammed, et al., "Adaptive Data Compression for Energy Harvesting Wireless Sensor Nodes," IEEE, 2013, 7pp.

P. Urbanek, et al., "Adaptive Cloud Context Compression for Flight Data Recorder Streaming," IP.com, IP.com No. IPCOM000260044D, Oct. 15, 2019, 6 pp.

Q. Gong, et al., "Spatiotemporally Adaptive Compression for Scientific Dataset With Feature Preservation—A Case Study on Simulation Data With Extreme Climate Events Analysis," Jan. 6, 2024, 10pp.

* cited by examiner

1200

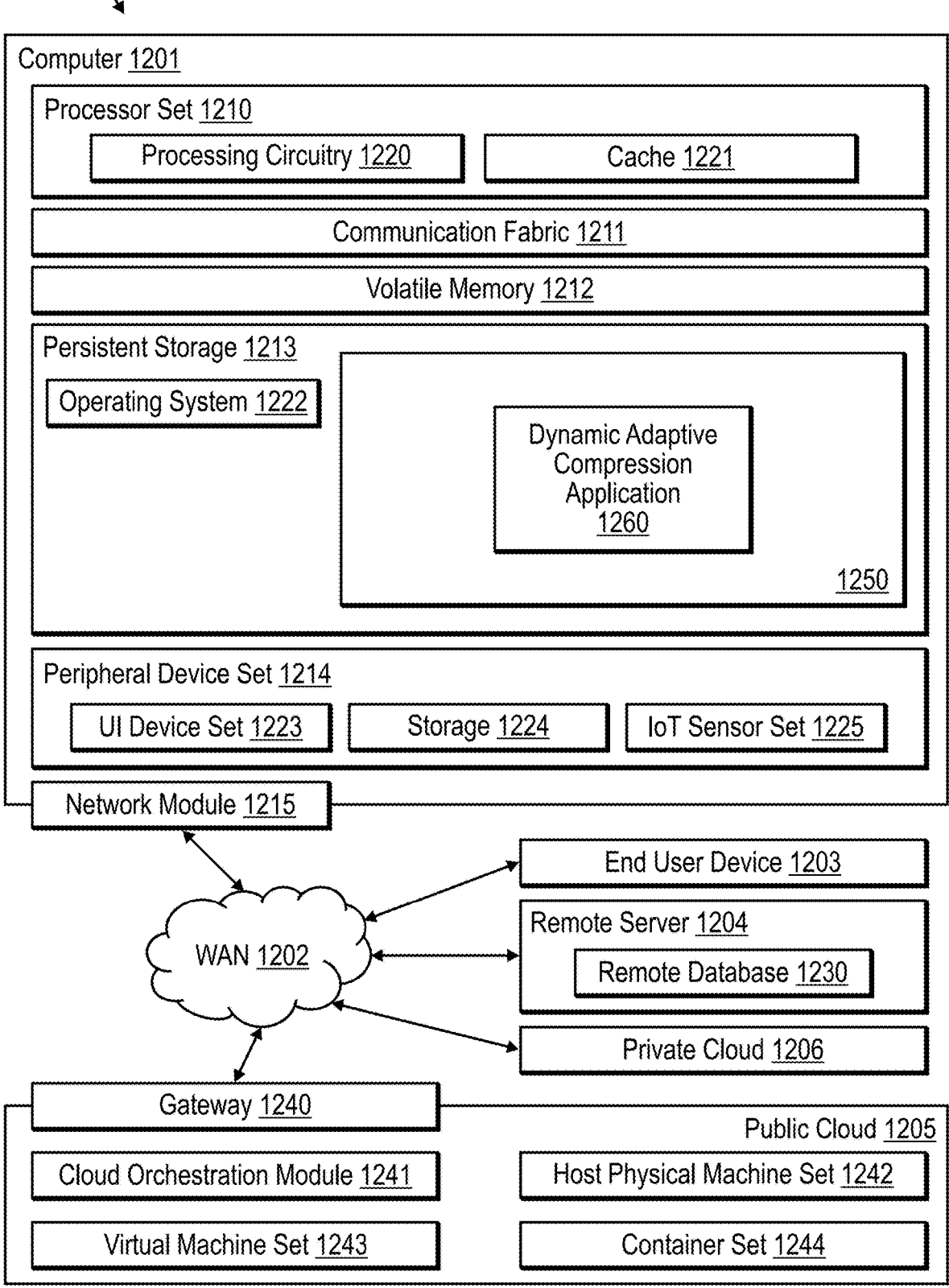

Computer 1201

Processor Set 1210

Processing Circuitry 1220    Cache 1221

Communication Fabric 1211

Volatile Memory 1212

Persistent Storage 1213

Operating System 1222

Dynamic Adaptive Compression Application 1260

1250

Peripheral Device Set 1214

UI Device Set 1223    Storage 1224    IoT Sensor Set 1225

Network Module 1215

WAN 1202

End User Device 1203

Remote Server 1204

Remote Database 1230

Private Cloud 1206

Gateway 1240

Public Cloud 1205

Cloud Orchestration Module 1241    Host Physical Machine Set 1242

Virtual Machine Set 1243    Container Set 1244

FIG. 7

DEFERRED ADAPTIVE COMPRESSION USING COMPUTATIONAL STORAGE FOR ENERGY SAVINGS

BACKGROUND

Embodiments relate to a method, system, and computer program product for deferred adaptive compression using computational storage for energy savings.

A computing environment may be comprised of a storage controller that is coupled to a computational storage, where the computational storage comprises a storage architecture in which storage devices have additional compute capabilities associated with them. The presence of compute capabilities on the storage devices allows for operations against the data which would previously be non-viable for the storage controller to perform. In the data storage environment, the storage controller allows one or more host computational devices to access data stored in storage devices of the computational storage.

SUMMARY

Provided are a method, system, and computer program product for performing deferred adaptive compression via a computational storage. On a drive that is initially empty, all data is written as uncompressed. In response to a first threshold level of storage space utilization being reached on the drive, compression of existing data on the drive is initiated. In response to a second threshold level of storage space utilization being reached on the drive, operations are performed for compressing incoming data and then writing the compressed incoming data to the drive, wherein the second threshold level is higher than the first threshold level.

In additional embodiments, in response to the storage space utilization falling below a third threshold level of space utilization that is lower than the first threshold level of space utilization, the compression of data on the drive is stopped.

In further embodiments, operations are performed for monitoring the drive by the computational storage to reduce computational needs by performing compression only when necessary.

In certain embodiments, energy savings are generated via the deferred adaptive compression in the computational storage.

In additional embodiments, if the first threshold level is reached, then operations are performed for compressing existing data using access metrics, and for compressing via a background process when the drive is not busy.

In certain embodiments, variability avoidance in indicating free space is performed by indicating an amount of free space available on the drive by calculating the amount of free space if all the data on the drive were to be compressed, even though all the data on the drive is not actually compressed.

In additional embodiments, delay is introduced while responding for variability avoidance in response time while compression or decompression is not being performed in the computational storage.

BRIEF DESCRIPTION OF THE DRAWINGS

Referring now to the drawings in which like reference numbers represent corresponding parts throughout:

FIG. 7 illustrates a computing environment in which certain components may be implemented, in accordance with certain embodiments.

DETAILED DESCRIPTION

Figure 1:
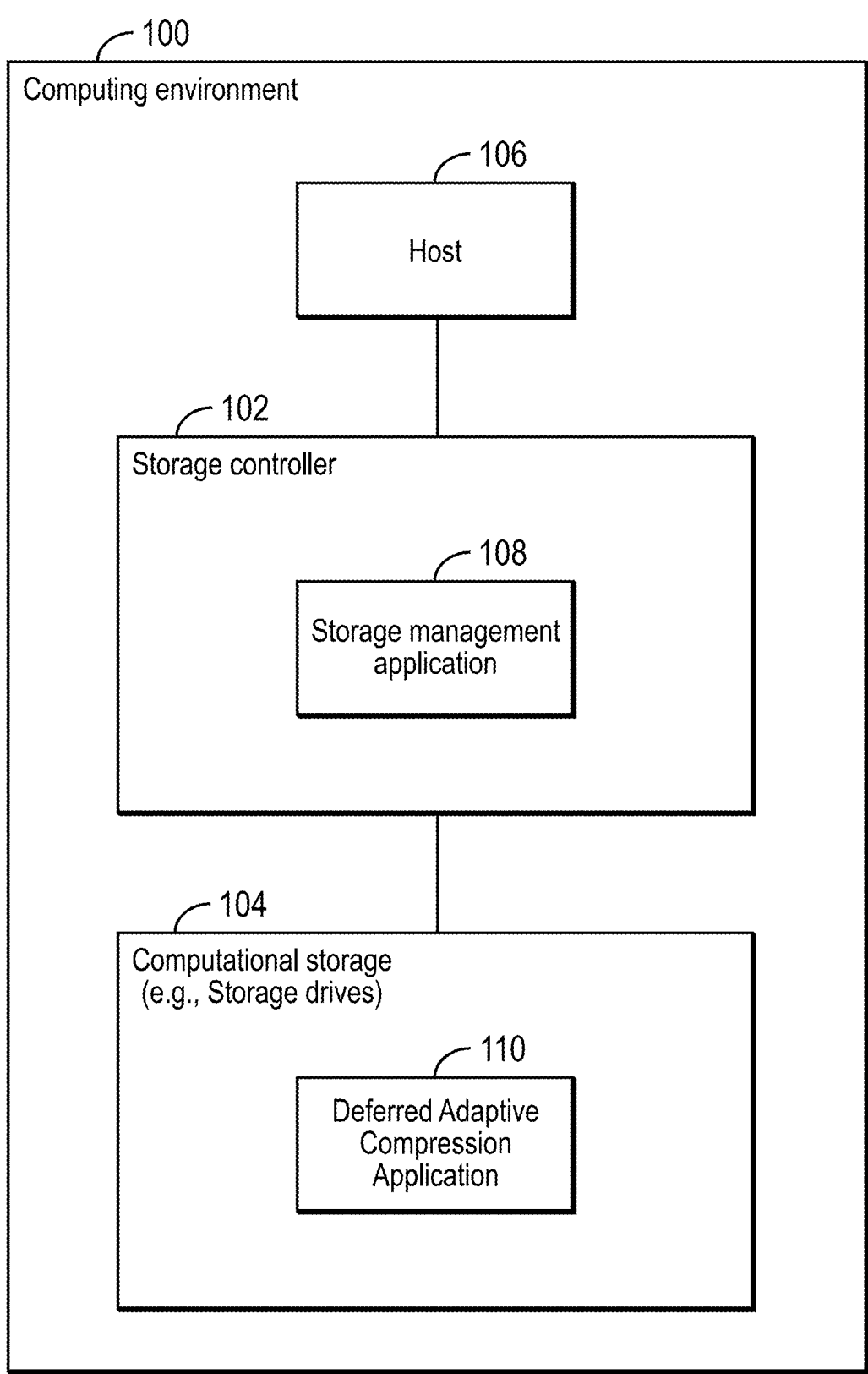
FIG. 1 illustrates a block diagram of a computing environment, in accordance with certain embodiments.

In the following description, reference is made to the accompanying drawings which form a part hereof and which illustrate several embodiments. It is understood that other embodiments may be utilized and structural and operational changes may be made.

Energy savings is an important area of focus in the information technology industry. For example, certain manufacturers adjust the frequency of semiconductor chips in a tradeoff between energy savings and performance.

Disk compression is another area of optimization where a tradeoff between energy savings and performance is made. With current technology end users may choose to entirely compress data or to entirely not compress data in their storage systems. This decision has traditionally been based on space savings versus performance. For many years, disk compression has been performed using the storage subsystem's processors which can hide much, but not all, of the performance impact of using compression. More recently, computational storage has been used to do this compression. In computational storage each storage device (also referred to as storage unit) has an on-device processor such as a Field Programmable Gate Array (FPGA), instead of the compute power being at the storage array level. This is sometimes referred to as compute-on-storage.

Compressing data takes central processing unit (CPU) power, and therefore consumes energy. Higher levels of compression require more CPU usage and more energy consumption. With existing technology there does not exist a way to get the benefit of compression with zero performance impact and zero additional CPU (and therefore energy) consumption. Certain embodiments introduce the ability to secure the best of both worlds without negative side-effects.

Certain computational storage products may utilize an FPGA to compress data. These products do not perform the selective compression or compression only when necessary as performed by the embodiments of this disclosure.

The term "adaptive compression" generally refers to choosing between different compression algorithms to balance CPU usage, compression time, and space savings. It may be considered when storing data to disk or when sending data across a network. Existing mechanisms do not use adaptive compression in a similar way to the embodiments presented in this disclosure where initially no compression is performed, and where the embodiments hide the initial lack of compression (in terms of space savings and potentially decreased latency) from the user.

Certain embodiments compress data on a storage device only when necessary, in order to reduce energy usage, and additionally to hide the lack of compression from end users. As different thresholds of disk space usage are reached, certain embodiments may start compressing data either already stored, and/or start compressing incoming data to be written on the disk. This may allow the drive to be able to store the same amount of data as if the data had all been compressed when initially written to the disk, with less CPU and energy usage initially and over time.

As a result of certain embodiments presented in this disclosure, improvements are made in a computational storage to perform compression with energy savings by performing compression when necessary. The use of certain embodiments results in long term and ongoing energy savings for data based on the usage characteristics of that data. This results in immediate energy savings by not performing unnecessary compression. Certain embodiments adaptively compress data based on how that data is used. This allows the system to save energy by only compressing when the system has to compress.

FIG. 1 illustrates a block diagram of a computing environment 100, in accordance with certain embodiments.

A storage controller 102 is coupled to a computational storage 104, where the computational storage 104 may be comprised of one or more storage drives with compute capabilities. The storage controller 102 represents the physical storage volumes stored in the computational storage 104 as logical storage volumes, and provides access to the logical storage volumes to the host 106, where the host 106 comprises a computational device that may access data stored in the computational storage 104 via the storage controller 102.

The storage controller 102 and the host 106 may in certain embodiments comprise any suitable computational device known in the art such as a server, a personal computer, a laptop, a telephony device, a mainframe, etc.

A storage management application 108 executes in the storage controller 102. The storage management application 108 may offload certain tasks to the computational storage 104. For example, compression may be initiated by the storage management application 108 to be performed in the computational storage 104.

A deferred adaptive compression application 110 may execute in the computational storage 104. In certain embodiments, the storage management application 108 and the deferred adaptive compression application 110 may be implemented in hardware, firmware, software, or any combination thereof.

Figure 2:
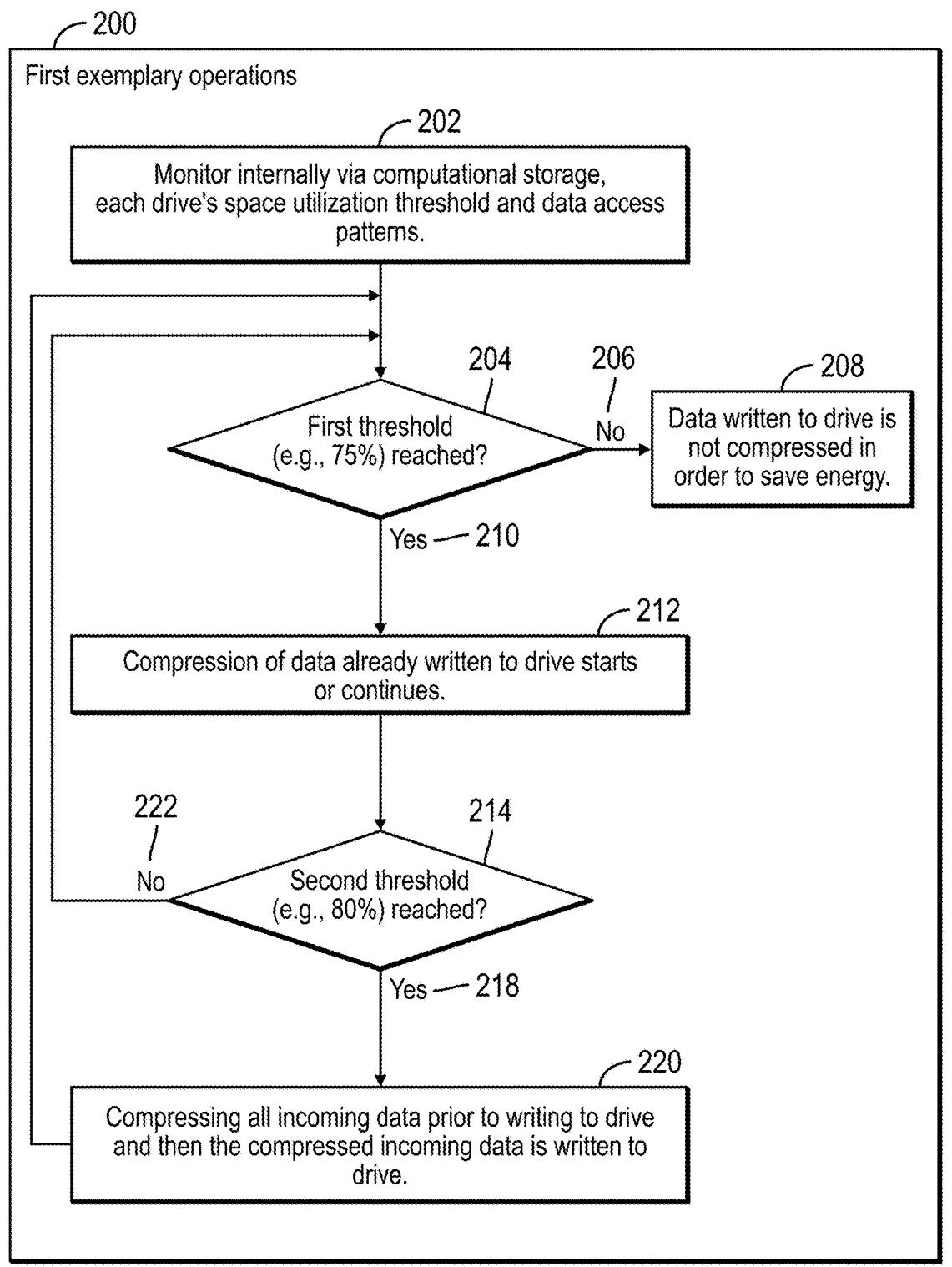
FIG. 2 illustrates a flowchart that shows first exemplary operations, in accordance with certain embodiments.

FIG. 2 illustrates a flowchart 200 that shows first exemplary operations, in accordance with certain embodiments.

In FIG. 2, control starts at block 202 in which the deferred adaptive compression application 110 in the computational storage 104 monitors each drive's space utilization threshold and data access patterns. Control proceeds to block 204 in which a determination is made as to whether a first threshold of storage space utilization (e.g., 75% storage space is utilized) has been reached. If not ("No" branch 206) control proceeds to block 208 in which data written to drive is not compressed in order to save energy.

If at block 204, a determination is made that the first threshold has been reached ("Yes" branch 210) control proceeds to block 212 in which compression of data already written to drive starts or continues.

From block 212 control proceeds to block 214 in which a determination is made as to whether a second threshold of storage space utilization (e.g., 80% storage space is utilized)

has been reached. If so ("Yes" branch 218), control proceeds to block 220 where all incoming data is compressed prior to writing to drive and then the compressed incoming data is written to drive.

From block 220 control returns to block 204. Also at block 214, if the second threshold is not reached ("No" branch 222) control returns to block 204.

Therefore, FIG. 2 describes an embodiment in which on an initially empty drive, all data is written as uncompressed. Subsequent access of the data may be monitored by the computational storage, possibly by sampling of operations to reduce computational needs. When a first threshold is reached (e.g., 75% of the storage drive is full), compression starts. Initially the drive may start compressing existing data using access metrics. This compression may also be done in the background when the drive is not busy. At a second threshold (e.g., 80% of the storage drive is full), incoming data is compressed before it is written to the drive. As time goes on, if the drive space drops below the first threshold, incoming data is no longer compressed.

Figure 3:
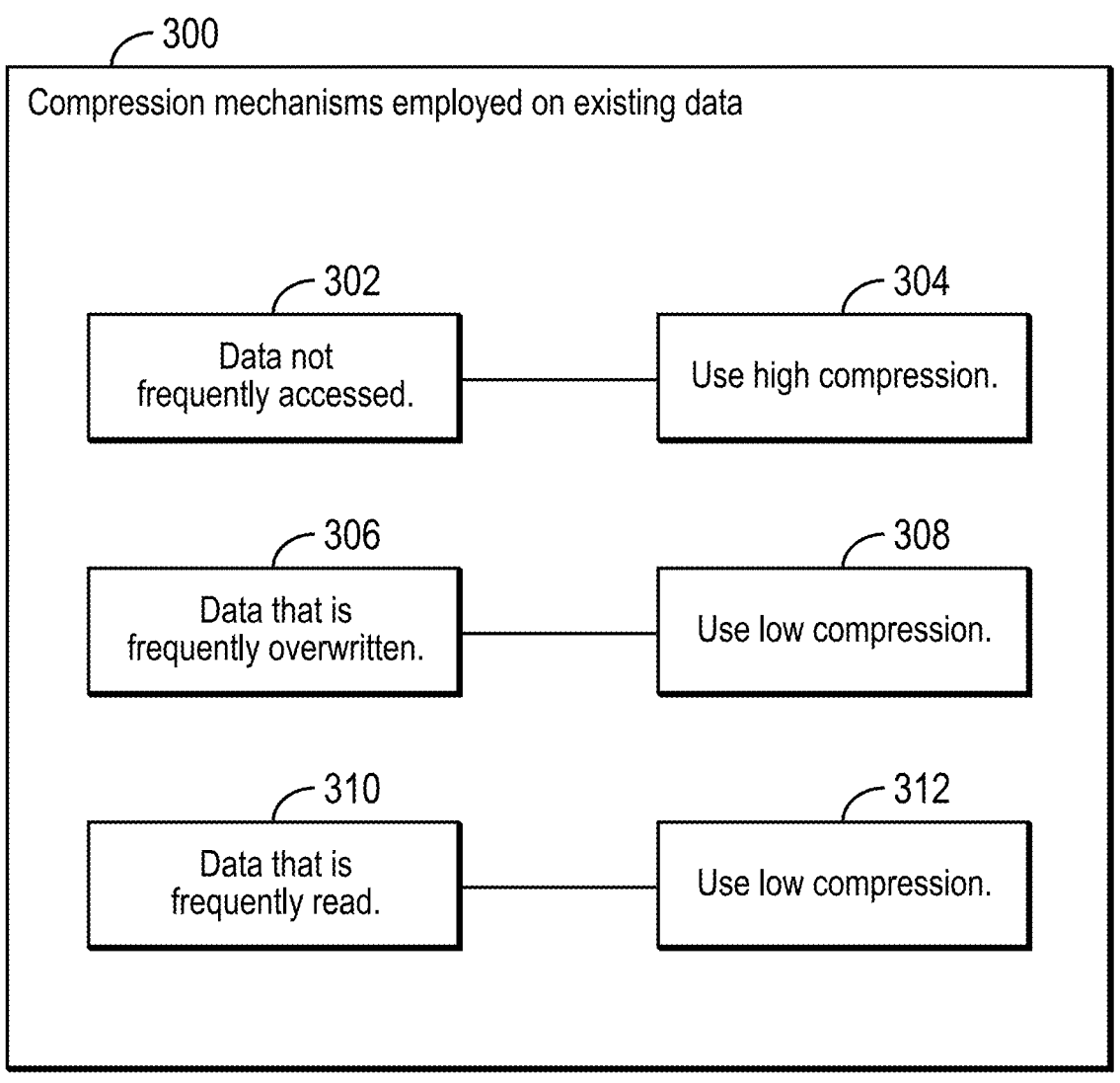
FIG. 3 illustrates a block diagram that shows compression mechanisms employed on existing data, in accordance with certain embodiments.

FIG. 3 illustrates a block diagram 300 that shows compression mechanisms employed on existing data in the computational storage 104, in accordance with certain embodiments. The compression mechanism to be employed for different types of data is shown in FIG. 3.

For example, in certain embodiments sampling of data access by a processor of computational storage 104 may be used to determine what data to compress. For example, the deferred adaptive compression application 110 may:

(i) Use high compression on data not frequently accessed (shown via reference numerals 302, 304);

(ii) Use low compression for data often overwritten (shown via reference numerals 306, 308); and (iii) Use low compression on data that is frequently read (shown via reference numerals 310, 312)

An additional aspect of certain embodiments is to use the drive's FPGA to track data usage in order to more intelligently compress data. For example, originally uncompressed data that is not modified and is rarely read can be highly compressed once the system needs to start compression. Data that is frequently read and written to can remain uncompressed as long as possible to avoid the overhead of frequent compression and decompression. Data in between these two extremes may use less intensive compression until more compression is required to maximize space usage on the drive.

Figure 4:
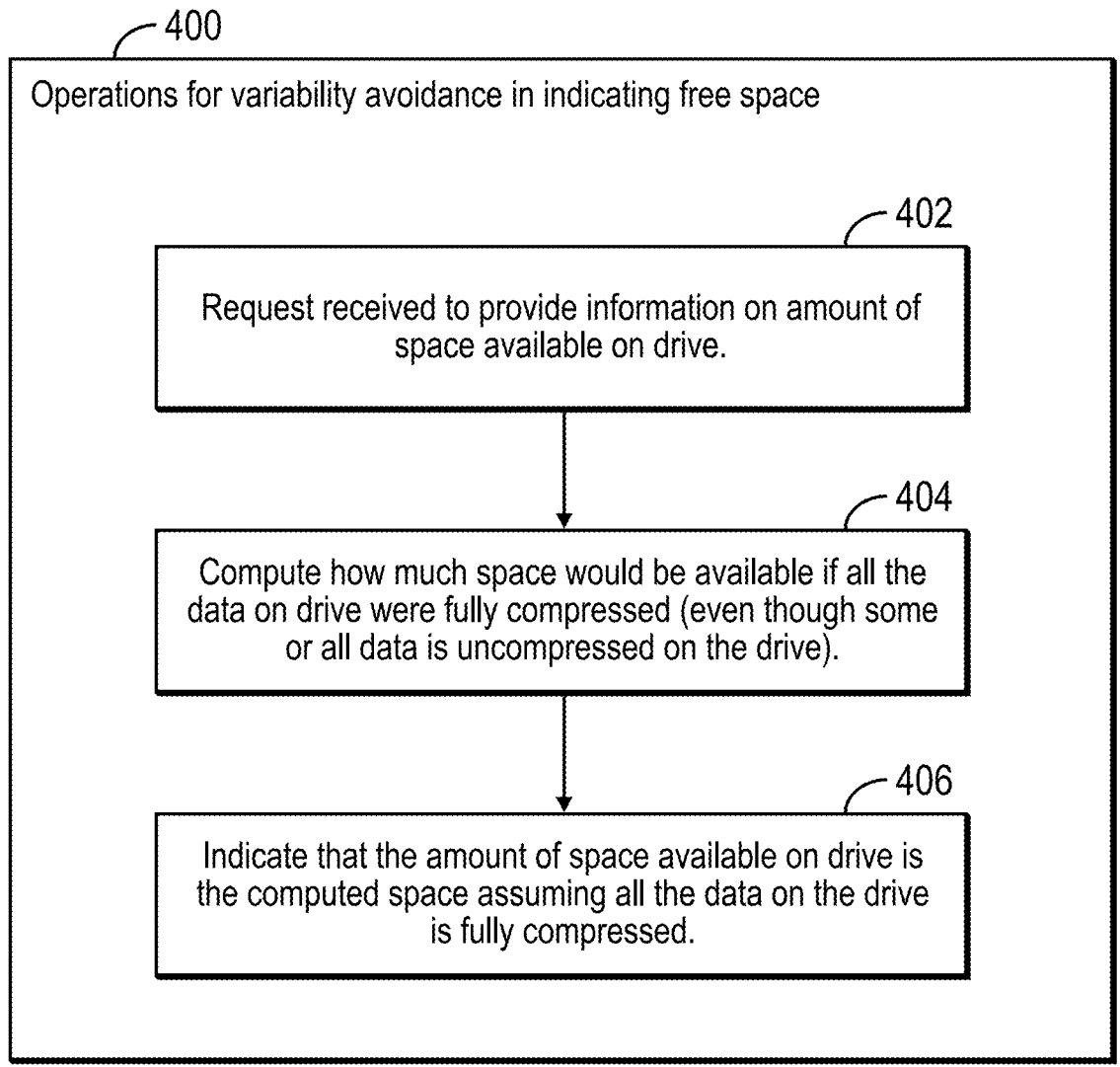
FIG. 4 illustrates a block diagram that shows operations for variability avoidance in indicating free space, in accordance with certain embodiments.

FIG. 4 illustrates a block diagram 400 that shows operations for variability avoidance in indicating free space, in accordance with certain embodiments.

Control starts at block 402 in which a request is received to provide information on the amount of space available on the drive. Control proceeds to block 404 in which the computational storage 104 computes how much space would be available if all the data on drive were fully compressed (even though some or all data is uncompressed on the drive).

From block 404 control proceeds to block 406 in which the computational storage 104 indicates that the amount of space available on drive is the computed space with the assumption that all the data on the drive is fully compressed Therefore, the user may only see how much storage is left as if the data on the drive has always been compressed. This prevents users from seeing unexpected changes in space available as the compression starts, as the drive passes the thresholds specified earlier. To enable this a mechanism to calculate the effective space available if compression was employed. This may be done using known ratios based on generic data, or certain embodiments may use low-intensity sampling of the data to better determine expected compression ratios.

Figure 5:
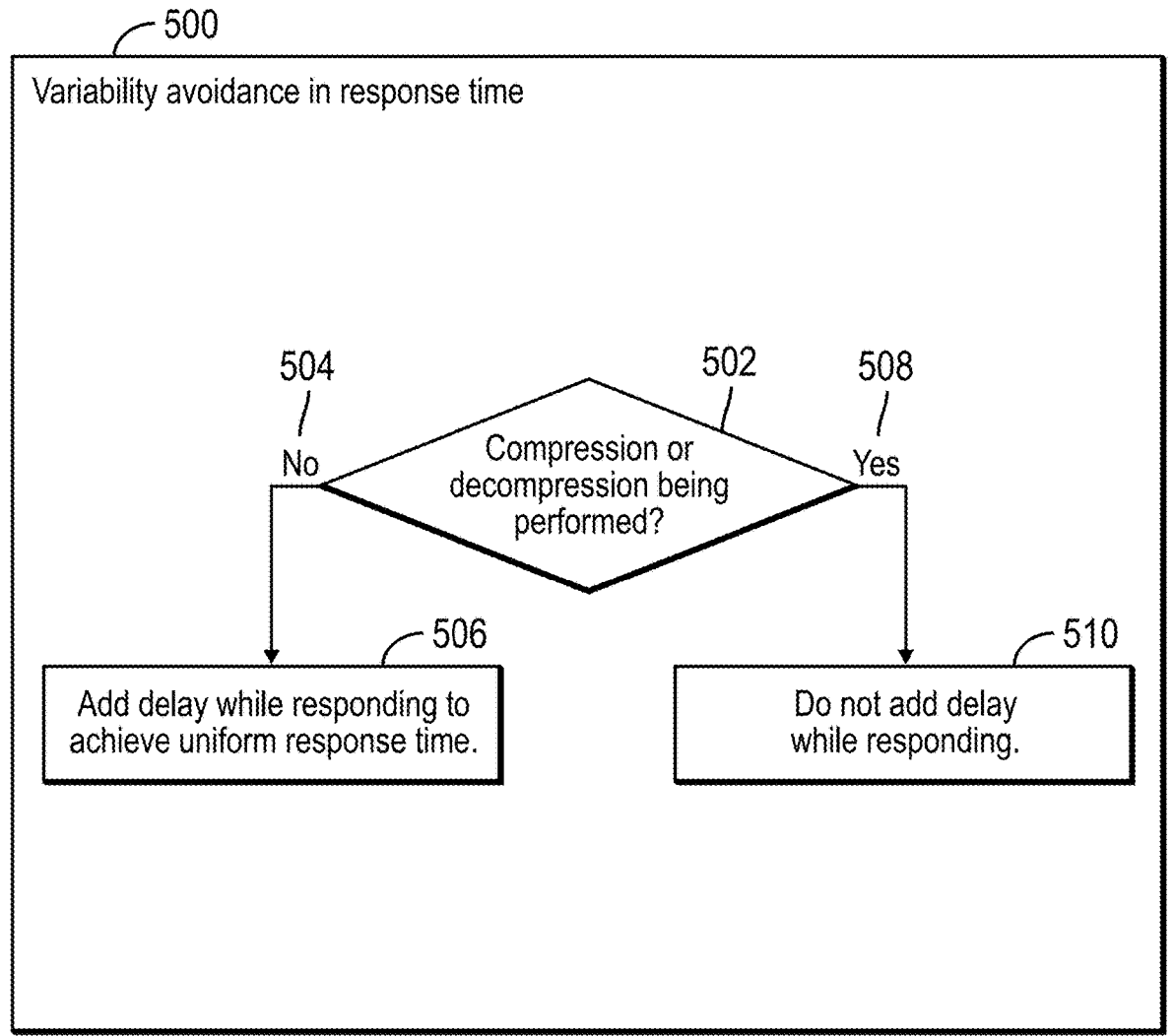
FIG. 5 illustrates a block diagram that shows operations for variability avoidance in response time, in accordance with certain embodiments.

FIG. 5 illustrates a block diagram 500 that shows operations for variability avoidance in response time, in accordance with certain embodiments.

In the embodiments described in FIGS. 1-4, the drive latency can vary. Initially as data is written to and read from the drive the data is not compressed. Later when the drive has filled up beyond the threshold to compress data, latency may increase. Since end users may desire consistent performance, certain embodiments can optionally provide a partition level setting to artificially add latency when the data is not compressed. If that option was enabled, the energy savings provided by the embodiments may still be gained. The amount of latency to add may be based on pre-measured compression latencies for generic data using the various compression mechanisms used in the embodiments.

For example, a determination is made at block 502 as to whether compression or decompression is being performed. If not ("No" branch 504) control proceeds to block 506 where delay is added while responding to achieve uniform response time. Otherwise ("Yes" branch 508) control proceeds to block 510 in which no delay is added while responding.

Figure 6:
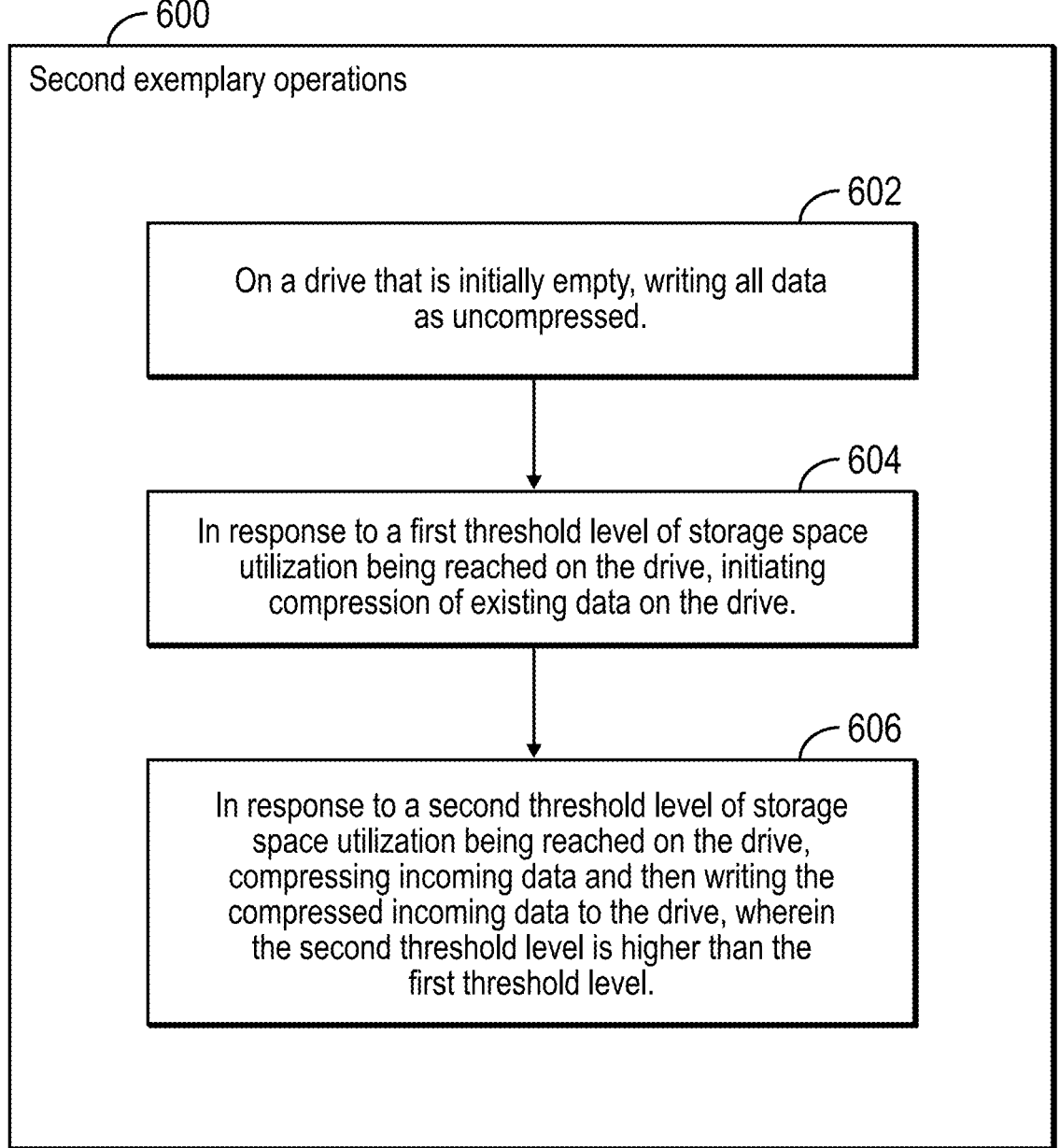
FIG. 6 illustrates a flowchart that shows second exemplary operations, in accordance with certain embodiments.

FIG. 6 illustrates a flowchart 600 that shows second exemplary operations, in accordance with certain embodiments.

Provided are a method, system, and computer program product for performing deferred adaptive compression via a computational storage 104. On a drive that is initially empty, all data is written as uncompressed (at block 602). In response to a first threshold level of storage space utilization being reached on the drive, compression of existing data on the drive is initiated (at block 604). In response to a second threshold level of storage space utilization being reached on the drive (at block 606), operations are performed for compressing incoming data and then writing the compressed incoming data to the drive, wherein the second threshold level is higher than the first threshold level.

Therefore, FIGS. 1-6 illustrate embodiments for deferred adaptive compression in a computational storage.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

In FIG. 7, computing environment 1200 contains an example of an environment for the execution of at least some of the computer code (block 1250) involved in performing the operations of an application for dynamic adaptive compression application 1260 that performs operations shown in FIGS. 1-6.

In addition to block 1250, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1250, as identified above), peripheral device set 1214 (including user interface (UI) device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in block 1250 in persistent storage 1213. COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, volatile memory 1212 is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid-state storage devices. Operating system 1222 may take several forms, such as various known proprietary operating systems or open-source Portable Operating System Interface-type operating systems that employ a kernel. The code included in block 1250 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. I/O T sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201), and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for performing deferred adaptive compression via a computational storage, the method comprising:
  on a drive that is initially empty, writing all data as uncompressed;
  in response to a first threshold level of storage space utilization being reached on the drive, initiating compression of existing data on the drive; and
  in response to a second threshold level of storage space utilization being reached on the drive, compressing incoming data, and then writing the compressed incoming data to the drive, wherein the second threshold level is higher than the first threshold level, wherein delay is introduced while responding for variability avoidance in response time while compression or decompression is not being performed in the computational storage, wherein an amount of delay that is introduced is based on pre-measured compression latencies for generic data, and wherein delay is not introduced while responding while compression or decompression is being performed in the computational storage.

2. The method of claim 1, the method further comprising:
  in response to the storage space utilization falling below a third threshold level of space utilization that is lower than the first threshold level of space utilization, stopping compression of data on the drive.

3. The method of claim 2, the method further comprising:
  monitoring the drive by the computational storage to reduce computational needs by performing compression only when necessary.

4. The method of claim 1, wherein energy savings are generated via the deferred adaptive compression in the computational storage.

5. The method of claim 1, wherein if the first threshold level is reached, compressing existing data using access metrics, and compressing via a background process when the drive is not busy.

6. The method of claim 1, wherein variability avoidance in indicating free space is performed by indicating an amount of free space available on the drive by calculating the amount of free space if all the data on the drive were to be compressed, even though all the data on the drive is not actually compressed.

7. A system comprising:
  a memory; and
  a processor coupled to the memory, wherein the processor performs operations, the operations comprising:
  on a drive that is initially empty, writing all data as uncompressed;
  in response to a first threshold level of storage space utilization being reached on the drive, initiating compression of existing data on the drive; and
  in response to a second threshold level of storage space utilization being reached on the drive, compressing incoming data, and then writing the compressed incoming data to the drive, wherein the second threshold level is higher than the first threshold level, wherein delay is introduced while responding for variability avoidance in response time while compression or decompression is not being performed in a computational storage, wherein an amount of delay that is introduced is based on pre-measured compression latencies for generic data, and wherein delay is not introduced while responding while compression or decompression is being performed in the computational storage.

8. The system of claim 7, the operations further comprising:
  in response to the storage space utilization falling below a third threshold level of space utilization that is lower than the first threshold level of space utilization, stopping compression of data on the drive.

9. The system of claim 8, the operations further comprising:
  monitoring the drive by the computational storage to reduce computational needs by performing compression only when necessary.

10. The system of claim 7, wherein energy savings are generated via deferred adaptive compression in the computational storage.

11. The system of claim 7, wherein if the first threshold level is reached, compressing existing data using access metrics, and compressing via a background process when the drive is not busy.

12. The system of claim 7, wherein variability avoidance in indicating free space is performed by indicating an amount of free space available on the drive by calculating the amount of free space if all the data on the drive were to be compressed, even though all the data on the drive is not actually compressed.

13. A computer program product for performing deferred adaptive compression via a computational storage, the computer program product comprising:
  one or more computer readable storage media; and
  program instructions stored on the one or more computer readable storage media to perform operations comprising:
  on a drive that is initially empty, writing all data as uncompressed;
  in response to a first threshold level of storage space utilization being reached on the drive, initiating compression of existing data on the drive; and
  in response to a second threshold level of storage space utilization being reached on the drive, compressing incoming data, and then writing the compressed incoming data to the drive, wherein the second threshold level is higher than the first threshold level, wherein delay is introduced while responding for variability avoidance in response time while compression or decompression is not being performed in the computational storage, wherein an amount of delay that is introduced is based on pre-measured compression latencies for generic data, and wherein delay is not introduced while responding while compression or decompression is being performed in the computational storage.

14. The computer program product of claim 13, the operations further comprising:
  in response to the storage space utilization falling below a third threshold level of space utilization that is lower than the first threshold level of space utilization, stopping compression of data on the drive.

15. The computer program product of claim 14, the operations further comprising:
  monitoring the drive by the computational storage to reduce computational needs by performing compression only when necessary.

16. The computer program product of claim 13, wherein energy savings are generated via the deferred adaptive compression in the computational storage.

17. The computer program product of claim 13, wherein if the first threshold level is reached, compressing existing data using access metrics, and compressing via a background process when the drive is not busy.

18. The computer program product of claim 13, wherein variability avoidance in indicating free space is performed by indicating an amount of free space available on the drive by calculating the amount of free space if all the data on the drive were to be compressed, even though all the data on the drive is not actually compressed.

\* \* \* \* \*